(12) United States Patent
Sareen et al.

(10) Patent No.: US 7,493,561 B2
(45) Date of Patent: Feb. 17, 2009

(54) STORAGE AND UTILIZATION OF SLIDE PRESENTATION SLIDES

(75) Inventors: Chaitanya Dev Sareen, Seattle, WA (US); Clara Graham, Redmond, WA (US); Erin Megan Riley, Seattle, WA (US); Jennifer Sadler, Seattle, WA (US); Kent Rogers Lowry, Seattle, WA (US); Louisa Chi Yan Lee, Kirkland, WA (US); Ravishankar Shanmugam, Redmond, WA (US); Sean Erik McAteer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 530 days.

(21) Appl. No.: 11/166,910

(22) Filed: Jun. 24, 2005

(65) Prior Publication Data
US 2006/0294468 A1  Dec. 28, 2006

(51) Int. Cl.
*G06F 3/00* (2006.01)
*G06F 17/00* (2006.01)

(52) U.S. Cl. .................. 715/732; 715/723; 715/730; 715/200; 715/201; 715/203

(58) Field of Classification Search ......... 715/715–732, 715/200–204
See application file for complete search history.

(56) References Cited

U.S. PATENT DOCUMENTS

| | | | |
|---|---|---|---|
| 5,572,644 A | 11/1996 | Liaw et al. | |
| 6,008,807 A | 12/1999 | Bretschneider et al. | |
| 6,041,333 A | 3/2000 | Bretschneider et al. | ..... 707/203 |
| 6,128,629 A | 10/2000 | Bretschneider et al. | |
| 6,369,835 B1 | 4/2002 | Lin | |
| 6,473,749 B1 | 10/2002 | Smith et al. | |
| 6,819,338 B2 * | 11/2004 | Heasman et al. | ............ 715/730 |
| 6,834,371 B1 | 12/2004 | Jensen et al. | |
| 6,938,032 B1 * | 8/2005 | Heath et al. | .................... 707/2 |
| 7,206,773 B2 | 4/2007 | Erol et al. | |
| 7,246,317 B2 | 7/2007 | Karasawa et al. | |
| 7,266,568 B1 | 9/2007 | Erol et al. | |
| 7,266,773 B2 * | 9/2007 | Dorwart | ..................... 715/731 |
| 2002/0138389 A1 * | 9/2002 | Martone et al. | ............... 705/36 |
| 2002/0164151 A1 * | 11/2002 | Jasinschi et al. | .............. 386/69 |
| 2002/0174085 A1 * | 11/2002 | Nelson et al. | .................. 707/1 |

(Continued)

OTHER PUBLICATIONS

U.S. Appl. No. 11/166,771, filed Jun. 24, 2005, Sareen et al.

(Continued)

*Primary Examiner*—Tadesse Hailu
(74) *Attorney, Agent, or Firm*—Merchant & Gould; Ryan T. Grace

(57) ABSTRACT slide presentation files may be separated into one or more individual slide files, and the one or more individual slide files may be stored in a remote or local slide library. Stored individual slide files are populated with metadata for allowing subsequent search and location of individual slide files. A synchronization relationship may be established between a stored slide file and a copy of the stored slide file used in a slide presentation document. As updates are made to the stored slide file, a user of a copy of the stored slide file may be informed of and provided changes made to the original slide file via the synchronization relationship.

20 Claims, 11 Drawing Sheets

U.S. PATENT DOCUMENTS

| | | | |
|---|---|---|---|
| 2003/0101043 | A1 | 5/2003 | Boegelund et al. |
| 2003/0222900 | A1 | 12/2003 | Schramm-Apple et al. |
| 2004/0001106 | A1* | 1/2004 | Deutscher et al. ........... 345/838 |
| 2004/0015595 | A1 | 1/2004 | Lin et al. |
| 2004/0071453 | A1 | 4/2004 | Valderas |
| 2004/0113934 | A1* | 6/2004 | Kleinman et al. ........... 345/732 |
| 2005/0246642 | A1 | 11/2005 | Valderas et al. |
| 2005/0289453 | A1* | 12/2005 | Segal et al. ................. 715/512 |

OTHER PUBLICATIONS

U.S. Appl. No. 11/167,065, filed Jun. 24, 2005, Sareen et al.

"Content Applications", Products—Content Applications, http://web.archive.org/web/20030810211219/www.documentum.com/products/content_a . . . , Aug. 10, 2003, (2 pages).

"Delivering format transformation and analysis for all content", EMC Documentum Content Transformation Services, Copyright 2006, EMC Corporation, 176 South Street, Hopkinton, MA 01748, www.EMC.com, (4 pages).

"Microsoft Office Picture Manager Basics", TAG Nov. 2006, www.eca.com.ve/classweb/docs/Picture%20Manager%20Workshop.pdf, Nov. 8, 2006 (4 pages).

"Microsoft Office Picture Manager", Microsoft Office Picture Manager—Wikipedia, the free encyclopedia, http://en.wikipedia.org/wiki/Microsoft_Office_Picture_Manager, Wikimedia Foundation, Inc., (2 pages) (Oct. 2007).

Microsoft Releases First Beta of "Office 11": Next Version of Office to Connect People, Information and Business Processes, http://www.microsoft.com/presspass/press/2002/Oct02/10-22Office11Beta1PR.mspx, Oct. 2, 2002, (1 page).

"SpanSoft", Software from SpanSoft at Download-By.Net, http://www.download-by.net/company/spansoft.html, Copyright 2006, (4 pages).

"What is Slide Librarian", Slide Librarian, Current Version 2.4, http://www.spansoft.org/slide_rt.htm, (3 pages) (Date Printed Dec. 7, 2007).

U.S. Office Action dated Jan. 29, 2008 cited in U.S. Appl. No. 11/166,771, (11 pages).

U.S. Office Action dated Jul. 2, 2007, cited in U.S. Appl. No. 11/167,065, (11 pages).

U.S. Final Office Action dated Dec. 27, 2007 cited in U.S. Appl. No. 11/167,065, (13 pages).

* cited by examiner

Confirm Slide Replace
There is 1 out of 25 slides that has the same name.
Would you like to replace the existing slide 'Microsoft Office System_001'
Modified by: Bob Jones
Modified: Tuesday, September 07, 2004, 10:50 AM
with this one?
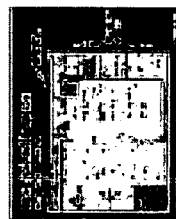
Modified by: Susan Anthony
Modified: Thursday, October 07, 2004, 8:51 AM
[Replace] [Skip] [Cancel]
*Fig. 6*

STORAGE AND UTILIZATION OF SLIDE PRESENTATION SLIDES

CROSS REFERENCE TO RELATED APPLICATIONS

This application is related to U.S. application Ser. No. 11/166,771, entitled "Storage and Utilization of Slide Presentation Slides," and U.S. application Ser. No. 11/167,065, entitled "Storage and Utilization of Slide Presentation Slides", each owned by the Microsoft Corporation, filed concurrently herewith and incorporated in their entireties.

BACKGROUND

Computer and software users have grown accustomed to user-friendly software applications that help them write, calculate, organize, prepare presentations, send and receive electronic mail, make music, and the like. For example, modern electronic word processing applications allow users to prepare a variety of useful documents. Modern spreadsheet applications allow users to enter, manipulate, and organize data. Modern electronic slide presentation applications allow users to create a variety of slide presentations containing text, pictures, data or other useful objects. Modern database applications allow users to store, organize and exchange large amounts of data.

Documents created by such applications typically retain a good deal of value after their initial use. Such documents may be reused entirely, or portions of such documents may be used in other documents. The reuse of entire documents or portions of documents is a common and valuable practice by many information workers who wish to save time and make their work more efficient by reusing previous work product. Unfortunately, reuse of individual or groups of slide presentation application slides is often difficult and cumbersome. Finding a particular slide from a given presentation may require a user to open several presentation documents and peruse all slides contained in the open documents until a desired slide is found. If a desired slide is located, use of the slide is often difficult. A user may be forced to leave her open slide presentation, look for the desired presentation file, open a located file, look for a specific slide, copy the specific slide, and then return to her slide presentation to paste the copied slide. This process is tedious and time consuming.

In addition, after a user has located and has used a given slide from a slide presentation, a problem often arises around maintenance of the slide. For example, if a side used by the user is updated with new data or information after the user copies the slide, the user will have no way of knowing she should update the slide. For another example, if the original slide contained an error that was later discovered and corrected by the slide author or editor, the user has no way of knowing of the error or of the correction unless she is contacted regarding the slide correction or unless she discovers and corrects the error independently.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments of the present invention solve the above and other problems by providing methods, systems, and computer products for storing and utilizing individual and/or groups of slides from slide presentation documents. According to one aspect of the invention, individual slides may be isolated from a slide presentation and then may be published to a slide library. A document-shredding component is used for separating a given slide presentation into individual slide files and for storing one or more individual slide files in the slide library for subsequent use. As each individual slide is generated, into a single file, it is stored to the slide library, and the individual slide file is populated with metadata to allow the slide file to be easily located during a subsequent search of stored slide files.

According to aspects of the invention, a slide file may be searched, located and copied from the slide library for use in a given slide presentation document. A search of the slide library may be made at the slide library via a slide file reuse user interface. Located slide files in the slide library may be copied and edited. One or more slide files may be sent from the slide library to a slide presentation document for generating a new slide presentation or for editing an existing slide presentation. A search of the slide library also may be conducted from an open slide presentation application document. Thus, if a user is preparing a slide presentation, she may search the slide library from her open slide presentation document and automatically insert a located slide file.

According to another aspect of the invention, upon inserting a located slide file into a slide presentation, a slide synchronization relationship may be established between the original slide in the slide library and the copy of the original slide now in the slide presentation. Once the slide synchronization relationship is established, the user/preparer/editor of the presentation may be informed of updates or changes to the original slide, and the user has the option of incorporating the new or updated content into her presentation.

These and other features and advantages, which characterize the present invention, will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

FIG. 6 illustrates a computer screen display of a user interface for resolving duplicate or conflicting slide files saved to a slide library.

DETAILED DESCRIPTION

As briefly described above, embodiments of the present invention are directed to methods, systems, and computer products for storing and using slide presentation slides. According to embodiments of the present invention, slide presentation files may be separated into one or more individual slide files, and the one or more individual slide files may be stored in a remote or local slide library. Stored individual slide files are populated with metadata for allowing subsequent search and location of individual slide files. A synchronization relationship may be established between a stored slide file and a copy of the stored slide file used in a slide presentation document. As updates are made to the stored slide file, a user of a copy of the stored slide file may be informed of and provided changes made to the original slide file via the synchronization relationship.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
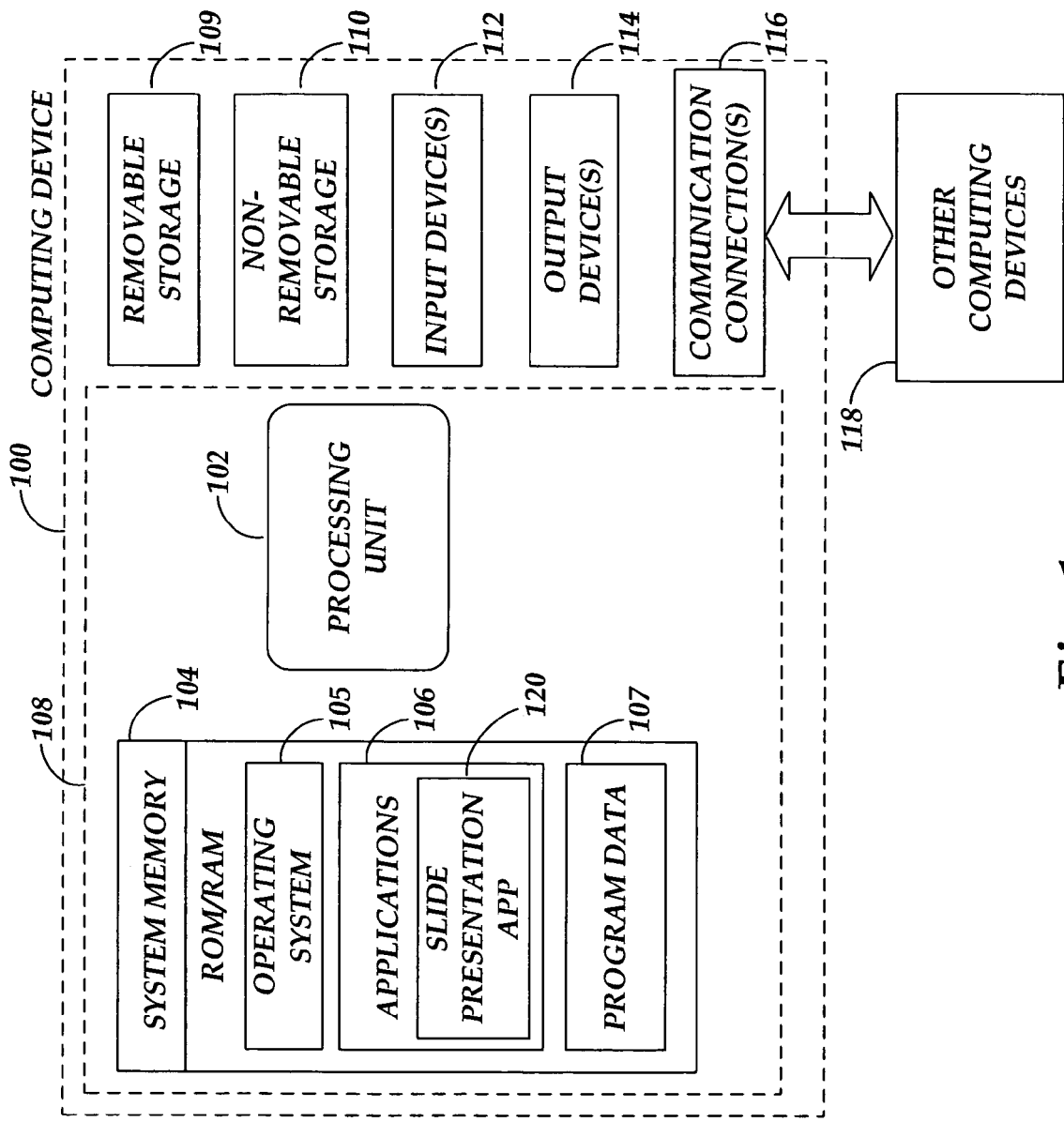
FIG. 1 illustrates an exemplary computing operating environment for embodiments of the present invention.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced .in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the invention includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications 106 and may include program data 107. This basic configuration is illustrated in FIG. 1 by those components within dashed line 108.

According to embodiments of the invention, the application 106 may comprise many types of programs, such as an electronic mail program, a calendaring program, an Internet browsing program, and the like. An example of such programs is OUTLOOK® manufactured by MICROSOFT CORPORATION. The application 106 may also comprise a multiple-functionality software application for providing many other types of functionalities. Such a multiple-functionality application may include a number of program modules, such as a word processing program, a spreadsheet program, a slide presentation program, a database program, and the like. An example of such a multiple-functionality application is OFFICE™ manufactured by MICROSOFT CORPORATION. According to embodiments of the present invention, the application 120 is representative of a slide presentation application for generating a variety of slide presentation documents. An example slide presentation application 120 is POWERPOINT® manufactured by MICROSOFT CORPORATION. As described in detail below, according to one embodiment, the slide presentation application 120 includes a document-shredding component for separating a slide presentation document into one or more individual slide files and for publishing the individual slide files to a slide library.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s)

112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
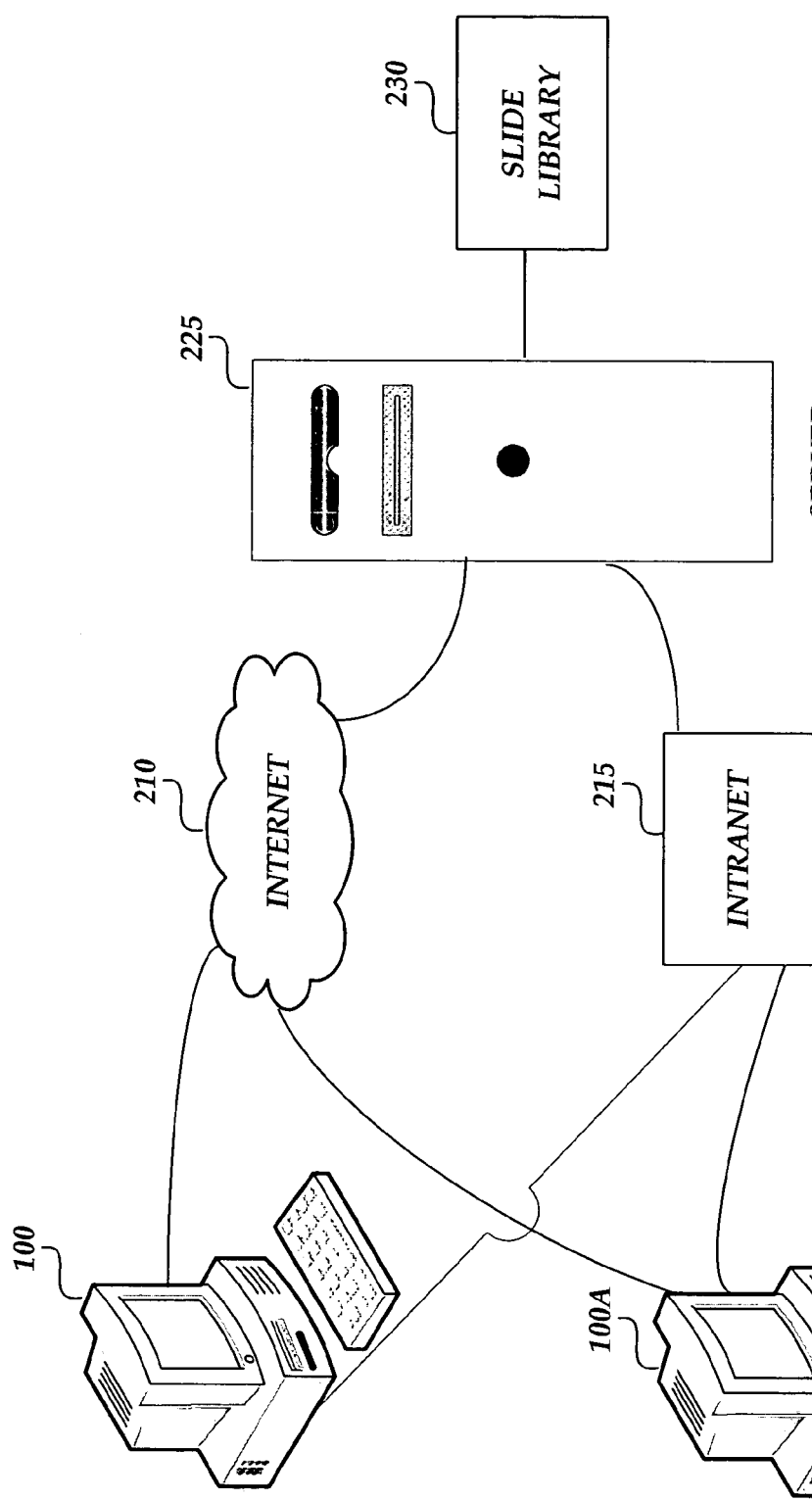
FIG. 2 is a simplified block diagram illustrating a distributed computing environment according to embodiments of the present invention.

FIG. 2 is a simplified block diagram illustrating a distributed computing environment for operation of embodiments of the present invention. As will be described in detail below, individual slides comprising one or more slide presentations may be stored as individual files in a slide library 230. The slide library 230 may be maintained at a remote server 225 for access by one or more computing devices 100, 100A via a distributed computing environment such as the Internet 210 or an intranet 215. As should be appreciated, however, the slide library 230 may be stored locally on a local computing device 100, 100A. Additionally, the slide library 230 may be operated as part of a shared services system with which multiple users may store, retrieve and share information in a collaborative working environment. An example shared services system suitable for use in accordance with embodiments of the present invention, is SHAREPOINT® manufactured by MICROSOFT CORPORATION of Redmond, Wash. However, as should be appreciated, any system suitable for allowing storage, searching and retrieval of one or more individual slide files according to embodiments of the present invention may be utilized for maintaining the slide library 230. According to embodiments of the invention, a user operating from a first computing device 100 may store individual slide files to the slide library 230. Once individual slide files are stored in the slide library 230, the first user may search for and retrieve individual slide files from the slide library 230, or a second user operating from a second computing device 100A may search, retrieve and utilize individual slide files maintained in the slide library 230 if the second user has access privileges to the slide library 230.

Publication of Presentation Slides to a Slide Library

Figure 3:
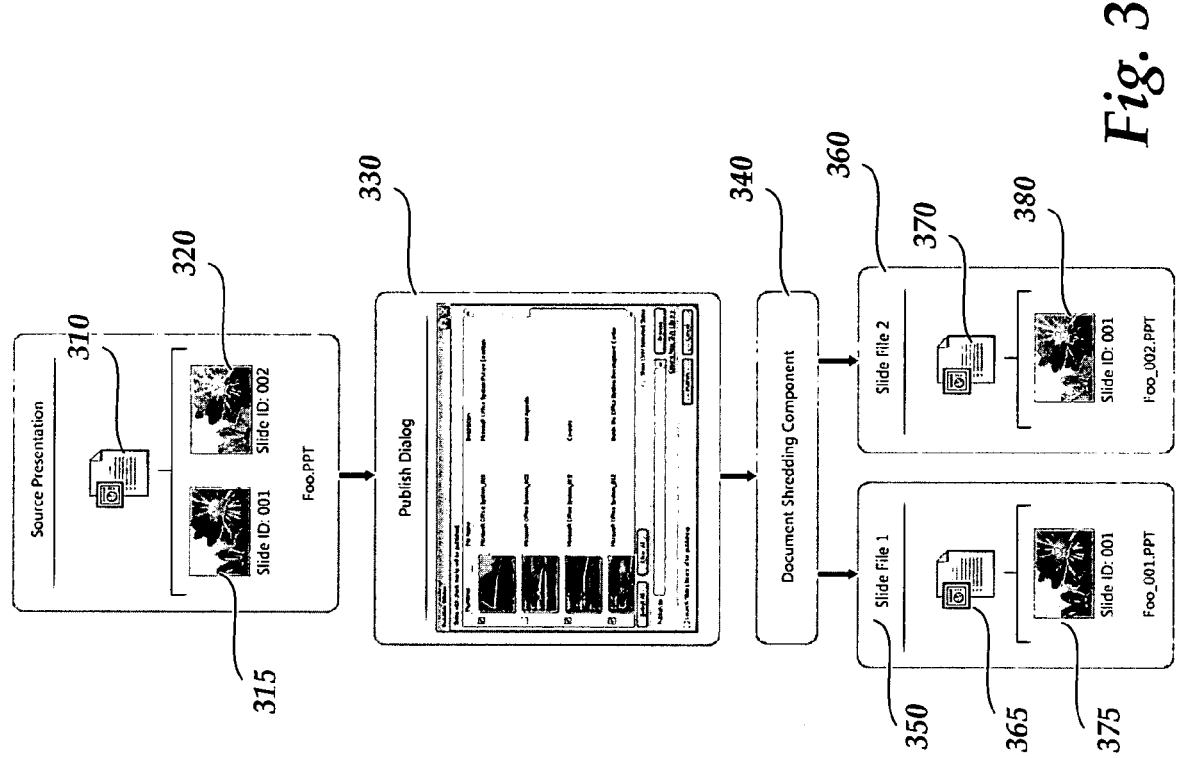
FIG. 3 is a simplified block diagram illustrating the publication of individual slide files from a slide presentation to a slide library.

The following description of FIG. 3 provides a general architectural description of the process for storing individual slides of a given slide presentation document as individual files in a slide library from which individual slide files may be subsequently retrieved and utilized according to embodiments of the present invention. Referring to FIG. 3, a source slide presentation 310 is illustrative of a slide presentation document that has been generated or is being currently edited or otherwise processed by a given user. For example, the user may be generating, editing or processing a slide presentation for a work or school project. The example slide presentation 310 is made up of one or more individual slides 315, 320. Each slide includes a unique slide identification number, for example "Slide ID: 001." The slide identification number may be used according to embodiments of the present invention for subsequently separating an individual slide file from the slide presentation and for identifying individual slides once they are stored to a slide library 230.

Referring still to FIG. 3, if the user desires to publish one or more of the individual slides of her slide presentation 310 to a slide library 230, the user may launch a slide publication user interface 330 for selecting one or more slides for publication (i.e., storage) in the slide library. As described in detail below, a document-shredding component 340 prepares each individual slide file and presents information in the user interface 330 for each slide file. After the user selects one or more individual slides for storage in the slide library 230, the document-shredding component 340 separates the slide presentation into individual slides, and sends selected slide files for storage in the slide library 230. For example, referring to FIG. 3, a first slide file 350 is generated by the document-shredding component that includes a single slide presentation document 365 containing a single slide file 375. A second slide file 360 is extracted from the slide presentation 310 by the document-shredding component to generate a second slide presentation document 370 containing a single slide file 380.

Figure 4:
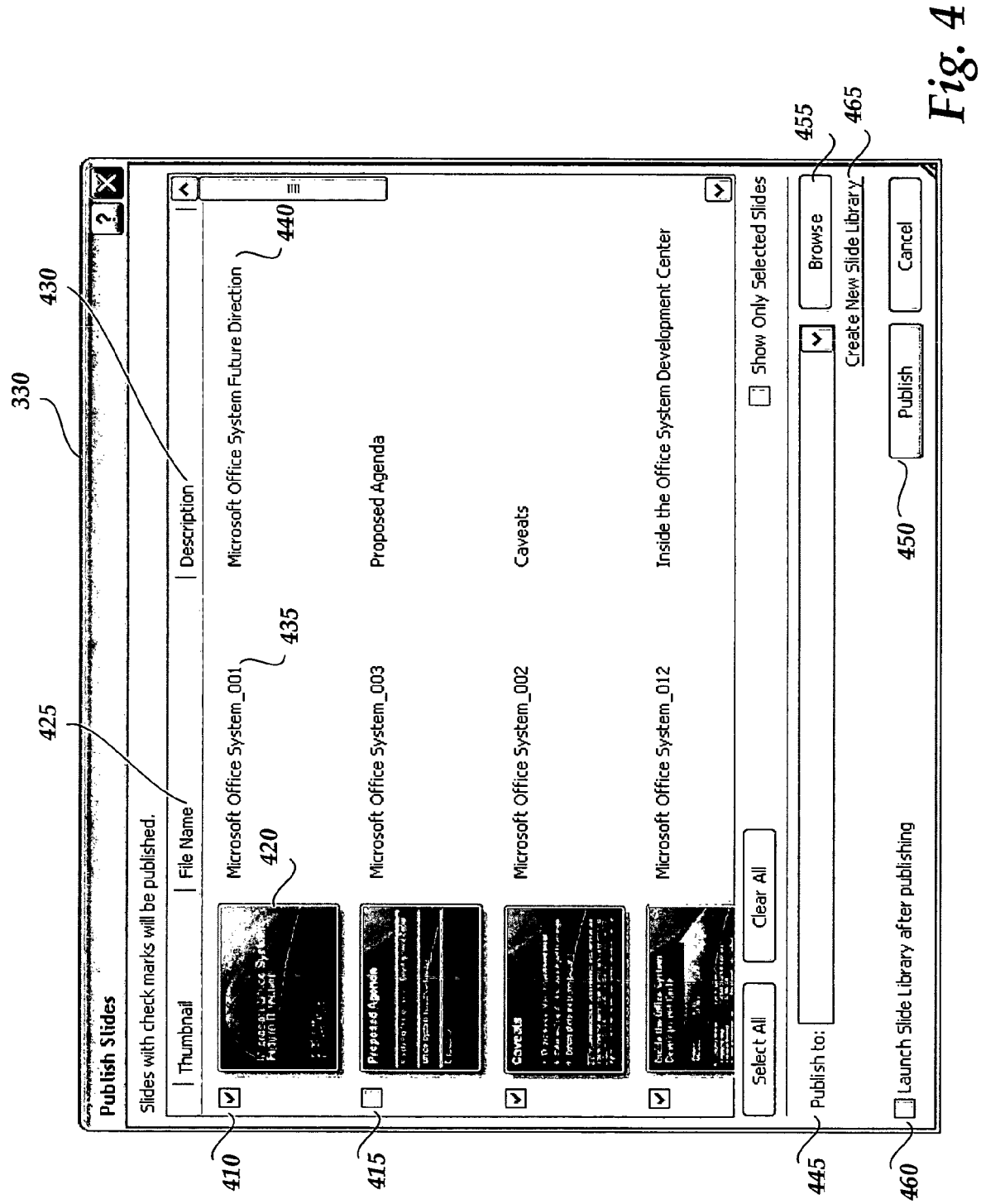
FIG. 4 illustrates a computer screen display of a slide publication user interface for publishing one or more slide files to a slide library.

As described above with reference to FIG. 3, in order to publish individual slides of a slide presentation document to a slide library 230, a slide publication user interface 330 is launched for selecting individual slides comprising a slide presentation for publication to the slide library 230. Referring now to FIG. 4, according to one embodiment of the present invention, the slide publication user interface 330 may be launched from a slide presentation application 120. That is, if a user is presently utilizing a slide presentation application 120 for generating, editing, or otherwise utilizing a given slide presentation document, the slide publication user interface 330 may be launched from the slide presentation application for storing one or more slide files to the slide library.

Launching the slide publication user interface 330 may be in response to selection of a button or other control situated in a user interface of the slide presentation application 120 associated with the functionality of publishing individual slides to a slide library. For example, selection of a toolbar command may cause a drop-down menu with which a user may selectively add, delete or edit slides of a given slide presentation and with which a user may select a control for publishing slides to a slide library 230 by launching the slide publication user interface 330. Additionally, a "publish slides" button or control may be included in a context menu that may be launched upon selection of an object in a given presentation slide followed by a secondary selection, for example, a right mouse click. As should be appreciated, other layouts and designs of user interface controls may be utilized for presenting a selectable button or control for launching the slide publication user interface 330 according to embodiments of the present invention. The slide publication user interface 330 is for purposes of example only and is not restrictive of different user interface layouts and designs that may be used in accordance with embodiments of the present invention.

According to an alternative embodiment, the slide publication functionality described herein may be part of a stand alone software application having sufficient computer executable instructions for publishing one or more slides of a selected slide presentation to a slide library 230. According to this alternative embodiment, the slide publication application allows for selection of a given slide presentation from a local or remote storage location. Once a given slide presentation is selected via the slide publication application, individual slides from the selected slide presentation may be published to a slide library 230. As should be appreciated, the slide publication functionality of the present invention whether operated via a slide presentation application 120, or as a stand alone slide publication application, may be operated at a local computing device 100, 100A, or the slide publication functionality may be operated remotely at a server 225 in association with the slide library 230.

Referring to FIG. 4, once the slide publication user interface 330 is launched, the document-shredding component, described below, populates the user interface 330 with information representative of each slide file that may be generated from the selected slide presentation. A thumbnail column, including thumbnail images 420 for each slide comprising an associated slide presentation, is populated in the user interface 330. According to one embodiment, the thumbnail images are bitmap or other suitable images dynamically generated by the document-shredding component for each associated slide. The thumbnail column is visible by default and is always present in the user interface 330. As the thumbnail column is widened, the thumbnail images 420 may be resized to scale according to the widened column space. Alternatively, if the width of the thumbnail column is reduced below a prescribed minimum size, for example, a thumbnail size of 12×9 pixels, the thumbnail images may be removed from display. The sorting order for the displayed thumbnail images 420 may be set to the presentation slide order by default. Alternatively, the sorting order of the thumbnail images 420 may be reversed by selecting the thumbnail column header.

Adjacent to each thumbnail image is a checkbox 410, 415 for selecting an associated slide for publication to the slide library 230. According to embodiments of the present invention, the state of the check boxes 410, 415 may be varied depending on how the slide publication user interface 330 is launched. For example, if a single slide is selected in a given slide presentation, then the check box for the single slide will be checked by default. On the other hand, if the slide publication user interface 330 is launched from a top-level command menu while no slide presentation is open, no slides will be selected by default. If a multi-select is committed from the slide presentation application document, and the slide publication user interface 330 is launched from a context menu, as described above, the same slide set will be checked in the associated check boxes 410, 415.

A file name column 425 adjacent to the thumbnail images 420 allows for automatic or manual population of a file name for each selected slide. According to one embodiment, the file name for a given slide is auto-populated by the document-shredding component (DSC), described below, according to the name or title of the associated presentation followed by an identification number for the associated slide, for example, "Microsoft Office System_001." The user may manually edit the file name information if a more descriptive or different file name is desired. For example, according to one embodiment, mousing over or otherwise focusing on the file name field for a given slide reveals an edit box with which edits to the file name may be made. Selecting during the mouse-over sets an insertion point in the field to allow a user to edit the field as desired. According to one embodiment, the file name entry is a required field. Accordingly, if a user attempts to delete the file name and leave the file name field empty, the field will revert to its previous file name state.

A description column 430 is illustrated adjacent to the file name column for populating the associated slide file with descriptive information that may subsequently be used for searching the associated slide file. According to one embodiment, the description column is visible by default and is always present in the user interface 330. The description column text for a given slide is auto-populated to include a title for the associated slide, if available. If the slide title is not available, the field will be empty as a default condition. As described above for the file name column, text contained in the description column for a given slide may be edited by user action. For example, mousing over or otherwise focusing on the description field for a given slide reveals an edit box with which edits may be made to the associated description. Selecting during the mouse-over or other focus on a given description field sets an insertion point in the field for allowing edits to the text of the description. As will be described below, information generated or entered for the file name and description for an individual slide is populated into metadata for the subsequently generated slide file that may be used for searching for the slide file from the slide library 230.

As described above, one or more individual slides may be selected for publication to a selected slide library 230 by selecting one or more check boxes 410, 415. Alternatively, the user may select all of the slides comprising a given slide presentation to be published to the slide library 230. A browse function 455 and a "publish to" field 445 are provided for browsing to one of one or more publication sites within the slide library 230. As should be appreciated, the slide library 230 may include a number of different storage sites for storing different types and/or categories of slide files. For example, the slide library 230 may include a folder for slide files associated with a first department of a business, a second folder may contain slides associated with a second department of the business, and so on. Once the user browses to, or otherwise enters, a particular slide library site, the publish button 450 may be selected for publishing the selected one or more slides to the selected slide library site. If desired, the "launch slide library after publishing" control 460 may be selected to allow the user to automatically launch a user interface for reviewing the contents of the selected slide library site after publication of the selected slide files to the selected slide library site.

Referring still to FIG. 4, near the lower right-hand corner of the user interface 330 is a "create a new slide library" control 465. According to embodiments of the present invention, if the present user has not created a slide library site for publishing the selected slide files, the "create new slide library" control may be selected for launching a folder selection dialog or user interface for allowing the selection of a site or for entering a path address at which the selected slide files will be published. Once a site is selected and confirmed by the user, a "create slide library" page may be launched as illustrated and described below with reference to FIG. 8. Once the user completes the form for creating a new slide library for publication of the selected slides, the "publish to" field 445 will be populated with a path to the newly created slide library location.

Figure 5:
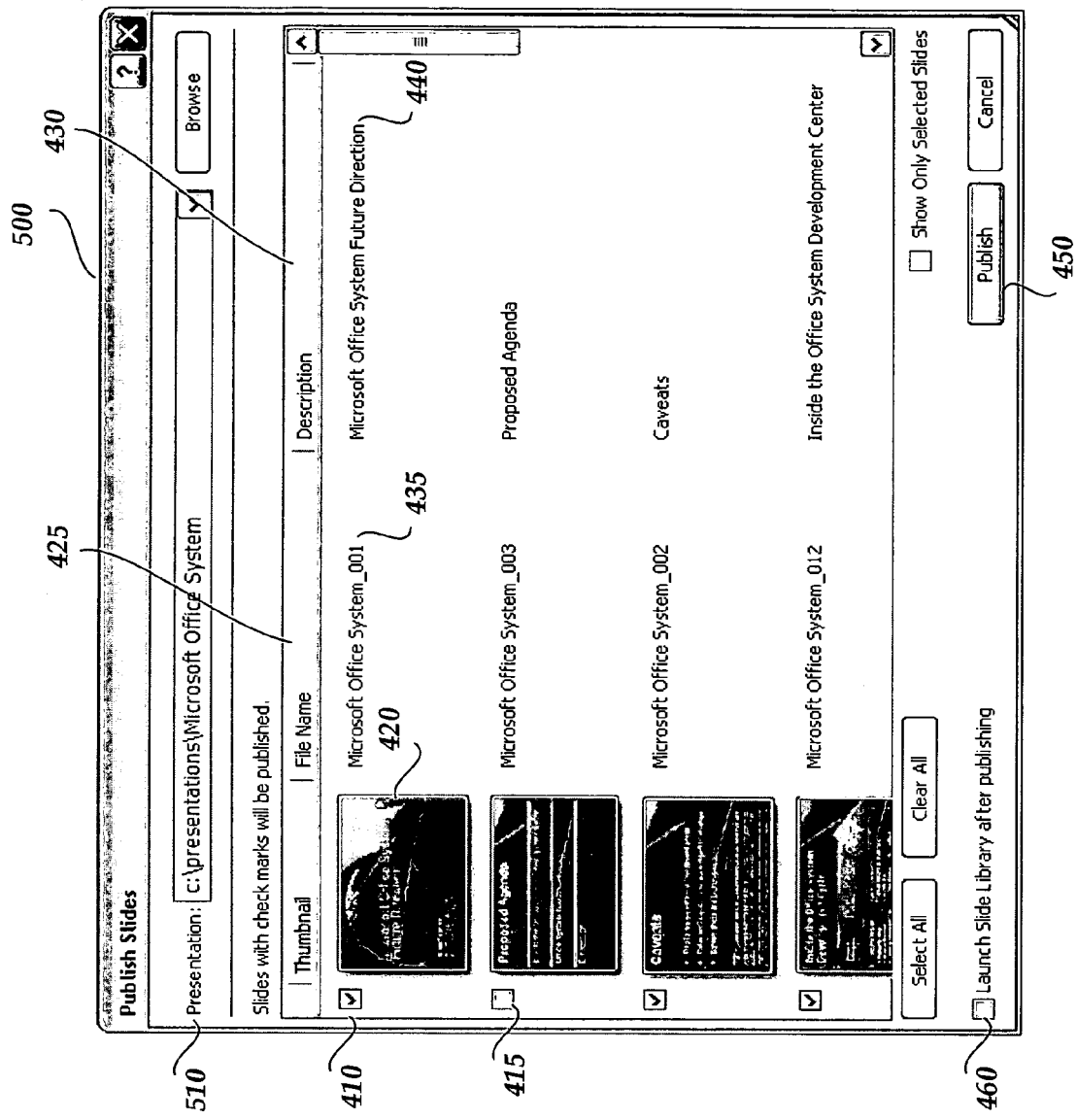
FIG. 5 illustrates a computer screen display of a slide publication user interface for publishing one or more slide files to a slide library.

Referring now to FIG. 5, in addition to launching the user interface 330 from within an open slide presentation application 120, it also may be launched directly from a slide library site at the server 225 or at any other location at which the slide library is maintained. If the slide publication user interface 330 is launched from the slide library site, the user interface 330 will include the "presentation" field 510 shown at the top of the user interface 330 illustrated in FIG. 5. The field 510 is then populated with a path to a source slide presentation file that the user desires to separate into individual slide files for publishing to the slide library, as described herein. Once a given slide presentation path is entered or browsed to using the presentation field 510, the associated slide information including the slide thumbnails, file names and descriptions are populated into the user interface 330, as described above.

During publication of one or more slides to a given slide library site, as described herein, a collision may occur between two slides bearing the exact slide file name. That is, a user may attempt to publish a slide file to a selected slide library site bearing the exact same file name and identification number as another slide file already stored at the same slide library site. If such a collision of slide file names occurs, a "confirm slide replace" dialog 600, illustrated in FIG. 6, may be presented to the user for handling the situation. If only a single file collision occurs, the dialog will provide a thumbnail 615 showing the presently stored slide file and providing information regarding the author or editor of the slide file and the date and time of the last modification. A thumbnail 620 showing the slide file that the user presently is attempting to load to the selected slide library site is shown along with information regarding the author/editor of the slide file and information regarding the date and time of the last modification. The user is then allowed to replace the present slide file with the new slide file by selecting the "replace" button 625, or the user may skip the replacement by selecting the "skip" button 630 such that the new slide is not entered into the slide library site as a replacement for the existing slide file.

If more than a single collision occurs, information may be provided in the user interface 600 that a number of slides have been identified with the same file name. Thumbnails for the first pair of colliding files will be presented, as illustrated in FIG. 6, to allow the user to decide whether to replace or skip the new slide file. Once the user makes a determination for the first pair of colliding files, the second pair of colliding files will be presented, and so on until the user has replaced or skipped all colliding slide files. Alternatively, a "replace all" button or control may be provided for allowing the user to replace all existing slide files with corresponding colliding slide files, if desired. Likewise, a "cancel" or "skip all" button or control may be provided for allowing the user to cancel the storage of the selected slide files to the selected slide library site.

Referring back to FIG. 3, as briefly described above, a document-shredding component (DSC) 340 is responsible for breaking or shredding a selected slide presentation document into one or more individual slide files for publication to a slide library 230. That is, each slide file selected for publication to the slide library is individually replicated by the document-shredding component (DSC) from the slide presentation document to a single slide presentation document in memory. According to embodiments of the present invention, the document-shredding component is a software application module containing sufficient computer executable instructions for parsing a selected slide presentation document into individual slide files and for populating the slide publication user interface 330 and each individual slide file with thumbnail images of each individual slide and with file name and description information as described above with reference to FIGS. 4 and 5. Other data that may be populated into each slide file includes an author, editor or modifier of the associated slide, whether the slide contains animation properties, the date on which the slide file is generated and stored, and the like. According to embodiments of the present invention, the document-shredding component is triggered by selection of a given presentation document for publication, as described above.

In response to triggering the document-shredding component, the slide publication user interface 330 is launched, the thumbnail images are generated, and the file name fields and description fields are auto-populated, as described above. For each selected slide presented in the user interface 330, the document-shredding component generates a new file. Metadata for each generated slide file is populated by the DSC with data associated with each slide file. For example, the metadata for a given slide file includes the file name, file description, path to generated thumbnail image, author/editor identification for the associated slide, date of slide file generation, and the like. Each selected slide file is then written to memory at the selected slide library site with the appropriate metadata that subsequently may be used for locating each slide file during a search.

Slide Libraries

Figure 7:
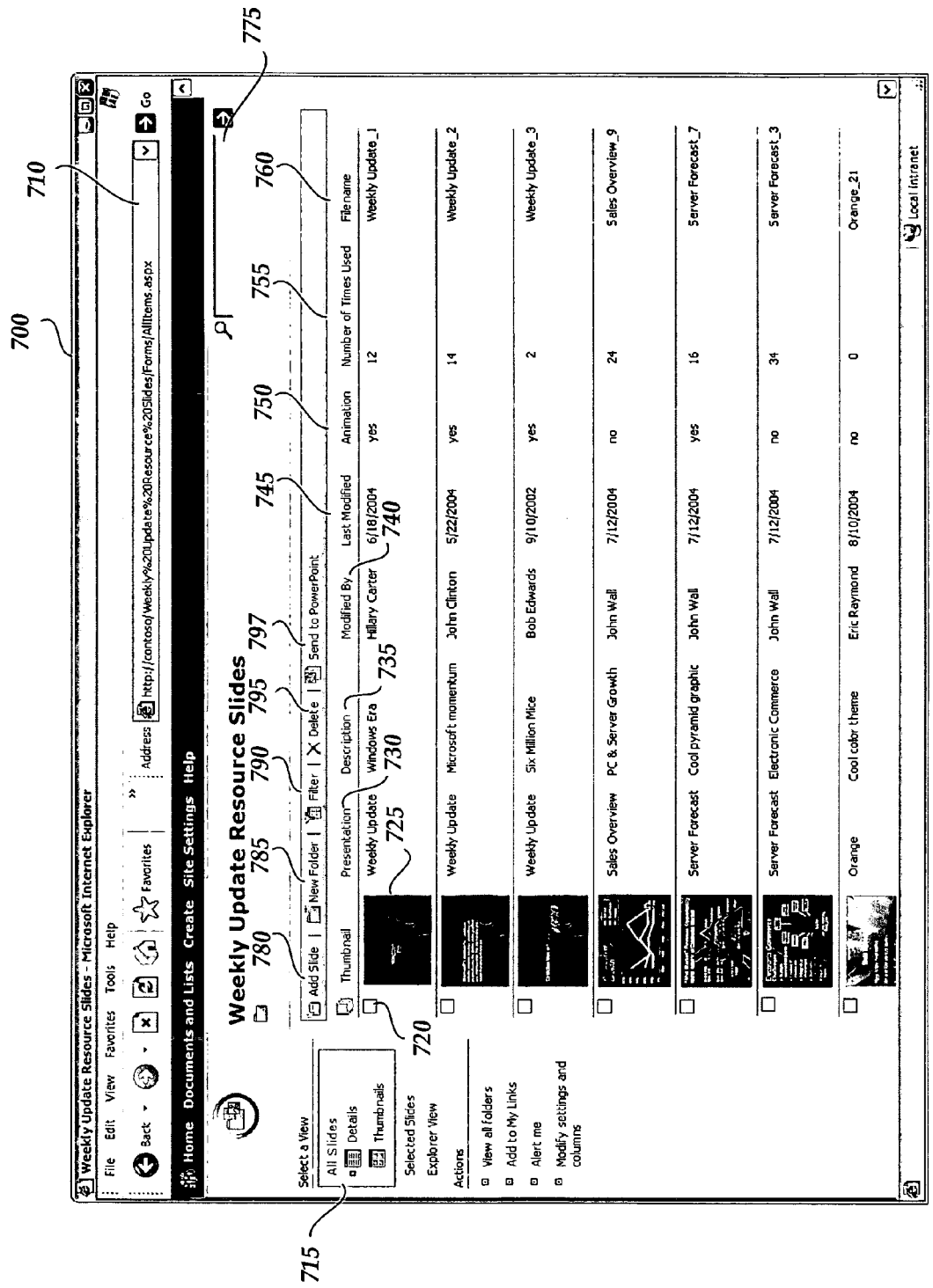
FIG. 7 illustrates a computer screen display of a user interface for accessing one or more slide files stored in a slide library.

As described above, individual slide files are generated from a selected slide presentation document and are published to a slide library site by the document-shredding component. According to embodiments of the present invention, the slide library 230 includes one or more storage sites for storing individual slide files generated by the DSC. Referring now to FIG. 7, a user interface 700 is illustrated for reviewing and utilizing the slide file contents stored in a given slide file site. Along the left side of the user interface 700 a user may select one or more views for presenting slide files contained in a selected slide library site. For example, the "all slides" 715 control may be selected for presenting all slides available in a given slide library site. Other controls, such as the "view all folders" control, may be selected for viewing information in all or additional storage folders contained in a given slide library site.

The user interface 700 presents information for each associated slide file in rows of data. As illustrated in FIG. 7, each row is divided into columns of metadata associated with each slide file. A "thumbnail" column includes a thumbnail image for each slide file. A "presentation" column 730 includes a title or description of a slide presentation document from which the associated slide was received. A "description" column 735 includes a description for the slide file. A "modified by" column 740 includes an identification of the author/editor/modifier who last modified the associated slide file. A "last modified" column 745 includes a date associated with the last modification of the associated slide file. An "animation" column 750 identifies whether the associated slide file includes animation properties. A "number of times used" column 755 provides a number of times the associated slide file has been copied from the slide library site by one or more users. The "file name" column 760 includes the file name for the associated slide file. Additionally, other columns of data, for example, a "publish date" column may be provided for providing information as to when an associated slide file was published to the selected slide library site.

According to one embodiment, slide files displayed in the user interface 700 may be sorted by selecting the column headers illustrated in the user interface 700. For example, the slide files may be sorted by "last modified" by selecting the "last modified" file header. Likewise, the slide files may be selected by "modified by" by selecting the "modified by" header, and so on. Alternatively, a "filter" button or control 790 may be selected for sorting the displayed files according to additional filtering properties. In addition, other views may be selected for the user interface 700. For example, a view may be selected for showing only the thumbnail images for each of the slide files in a given slide library site. Or, a view may be selected for showing only file names and associated data for each of the slide files in a given slide library site. As should be appreciated, a number of different views may be generated with different types and amounts of displayed data for individual slide files.

Referring still to FIG. 7, slide files may be added to a given slide library site by selecting the "add slide" control 780. Selecting the "add slide" control may provide the option of adding a slide file from a slide presentation document by launching the slide publication user interface 330 and by selecting a slide from a presentation document for publication to the slide library site by the DSC. Alternatively, a new slide may be added to the selected slide library site from another slide library site. A "new folder" button 785 allows for creating a new folder or site in the slide library to which one or more new slide files may be stored. One or more slide files from a selected slide library site may be deleted by selecting the "delete" button 795 in association with selected slide files.

As described above, once individual slide files are stored in the slide library 230, they may be retrieved from the slide library 230 according to different means. For example, a user presently operating a slide presentation application in which the user is generating or editing a slide presentation document may decide that an additional slide is needed, and the user may decide to review the contents of one or more slide library sites for a stored slide that will fulfill the user's present slide requirement. According to one embodiment, the user may select an "insert slide file" button or other similar control from the user's slide presentation application user interface. An additional button or control may then be provided to allow the user to insert a new slide from a slide library site. In response, the user interface 700 may be automatically launched by the user's slide presentation application without requiring the user to close the present slide presentation document. Once the user interface 700 is launched, the user may browse to a given slide library site of interest to the user. In order to browse to a given slide library site, the user may enter or select from previously entered slide library site addresses in the address field 710. For example, if the user is preparing a slide presentation regarding sales forecasts for a given sales department, the user may browse to a slide library site associated with that department.

Once the user has browsed to or selected a desired slide library site from which a desired slide file may be selected, the user may enter one or more keywords into the search field 775 for locating a particular slide file. For example, the user may enter a given presentation title, descriptive words, the name of a modifier/editor/author of the slide file, or any other information that has been stored with the slide file metadata, including text from the associated slide that may be used for searching for a particular slide file. After the user has entered one or more keywords and executed a search, slide files contained in the selected slide library site responsive to the executed search are displayed in the user interface 700. Alternatively, a user may select that all slides contained in the selected slide library site should be displayed from which the user may select one or more slide files for entry into her slide presentation document.

If the user locates a desired slide file, the user may select the check box 720 associated with the desired slide file. The user may then select a button or control such as the "send to PowerPoint" button 797 for sending the selected slide file to the user's slide presentation document. In response, the selected slide file will be inserted into the user's slide presentation document as desired. As should be appreciated, if the user selects more than one slide file for insertion into the slide presentation document, multiple slide files will be inserted into the slide presentation document as selected from the slide library site.

Alternatively, a new slide presentation document may be generated by selecting one or more slide files directly from a selected slide library site via the user interface 700. According to this embodiment, the user interface 700 may be launched in association with a selected slide library site. After a user selects one or more slide files, as described above, the user may select the "send to PowerPoint" button 797, and a slide presentation application 120 will automatically launch and populate a new slide presentation document with the selected slide files in the order in which the slide files are displayed in the user interface 700.

In addition to retrieving slide files stored in a given slide library site, slide files stored in a slide library site may be updated or modified by users having permissions for updating individual slide files. In order to update a given slide, the associated slide library site is browsed to in the same manner as is done for retrieving a given slide file. After a slide file for which edits are required or desired is selected, an edit control or button may be selected from the user interface 700 for editing the selected slide file using a slide presentation application. Once the desired slide is selected for editing, the slide is automatically marked as being checked out and is opened by the selected slide presentation application.

After the selected slide file is opened by the slide presentation application, the slide may be edited in the same manner as any slide may be edited according to the functionality of the associated slide presentation application. When changes made to the slide in the slide presentation application are saved, the changes automatically overwrite the associated slide file in the associated slide library site. According to one embodiment of the present invention, a slide versioning system is provided so that each version of an updated slide is maintained to allow a user to utilize a previous version of a given slide so that updating the given slide does not deny access to other users of a previous version of the slide.

According to embodiments of the present invention, slide library maintenance may be performed by users having proper credentials for accessing and making changes to slide library sites. As described above, when slide files are published from a slide presentation document to a new slide library site, the user may select to create a new slide library site in the slide library 230 at which the selected slide files will be stored. According to embodiments of the present invention, a "create slide library" link may be populated on a given slide library site for allowing the creation of a new slide library page. Or, as illustrated in FIG. 4, a "create new slide library" link 465 may be provided on the user interface 330 for creating a new slide library site during publication of one or more slide files to the slide library.

Figure 8:
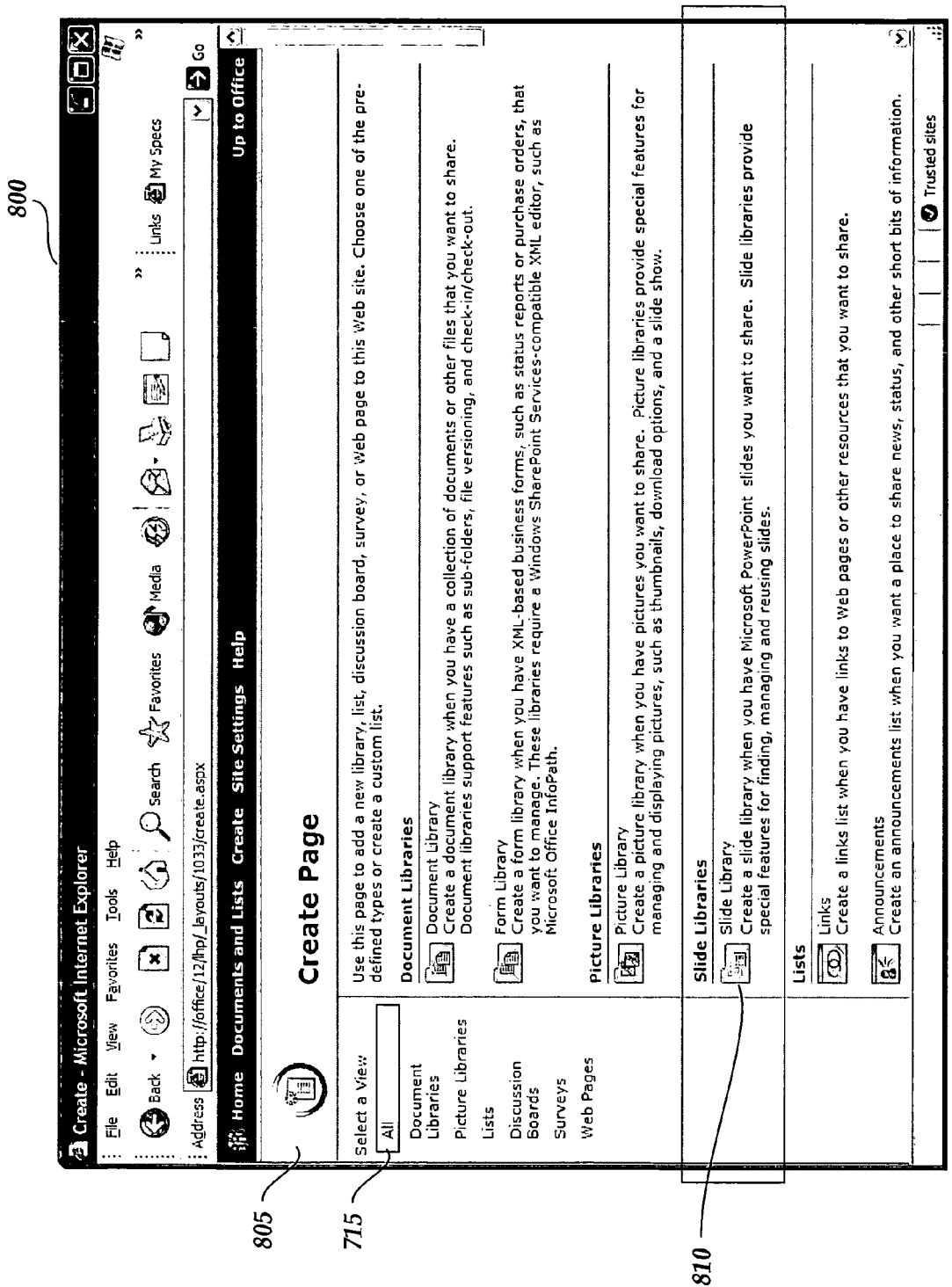
FIG. 8 illustrates a computer screen display of a user interface for creating a slide library storage site.
Figure 9:
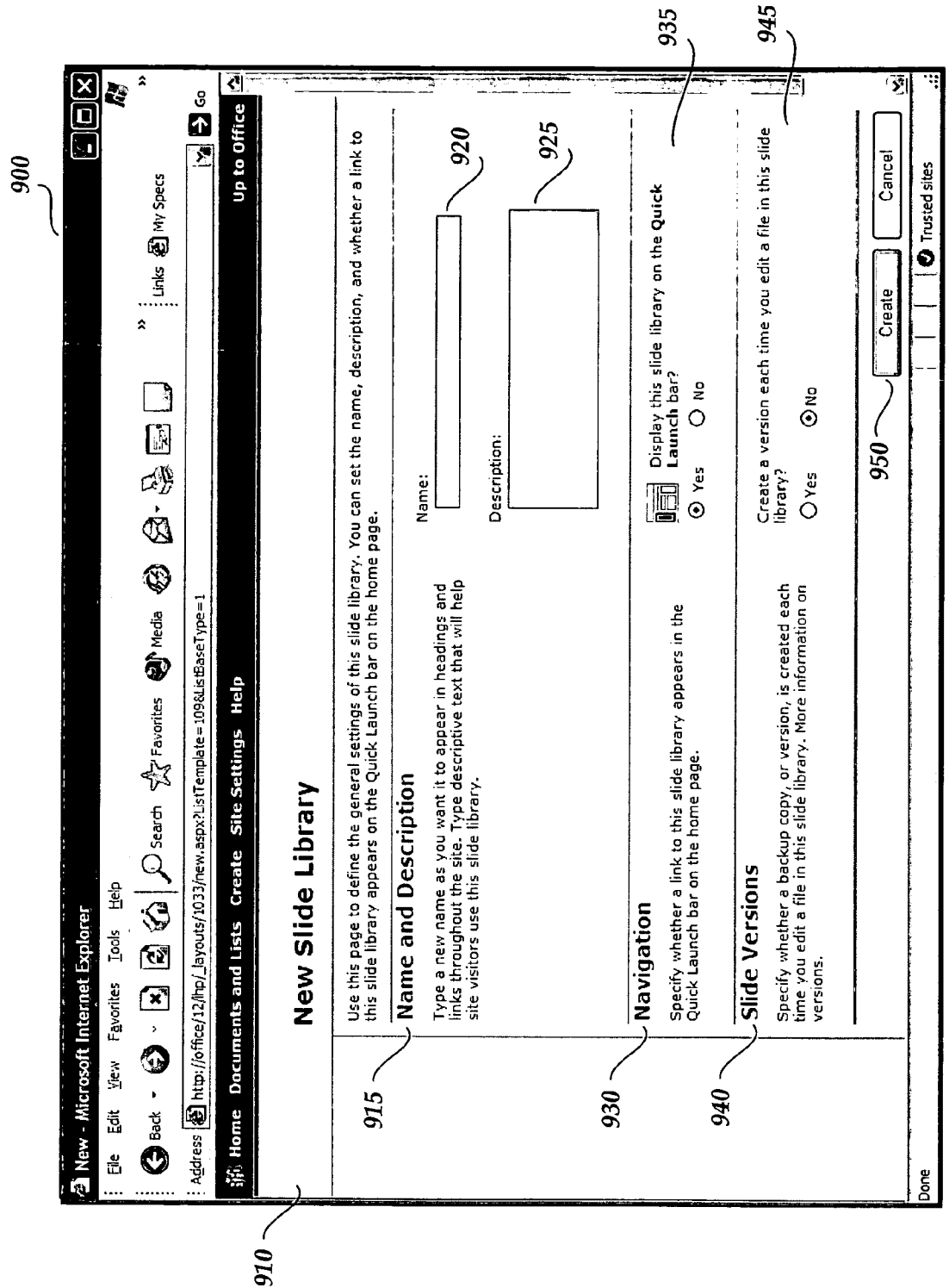
FIG. 9 illustrates a computer screen display of a user interface for creating a slide library storage site.

According to embodiments, selection of a "create slide library" link from one or more user interfaces launches the user interface 800, illustrated in FIG. 8, for allowing the creation of a new slide library site for storing one or more slide files, as described herein. At the "create page" user interface 800, a user may select the slide libraries control 810 for creating a slide library for containing one or more slide files, as described herein. In response to selecting the slide libraries control 810, the user interface 900, illustrated in FIG. 9, is provided with which a new slide library site may be created. A name and description section 915 is illustrated in which a name field 920 is provided for entering a name for the new slide library site. A description field 925 is provided for entering a description of the new slide library site. A navigation section 930 allows for the selection of navigation properties to be applied to the new slide library site, for example, allowing the new slide library site to be displayed on a quick-launch bar. A slide version section 940 is provided for allowing a user to selectively determine whether versioning will apply to modified slide files in the newly created slide library site, as described above. Selection of the "create" button 950 generates or instantiates the new slide library site.

Synchronization of Slides in Presentation Documents with Corresponding Slide Library Files According to another embodiment of the present invention, once a given slide file is inserted into a slide presentation document from a slide library site, a synchronization relationship may be established between the original slide file contained in the slide library site and the copy of the original slide file now contained in a slide presentation document. In order to establish the synchronization relationship, the slide presentation application encodes a path into the slide presentation document between the copy of the original slide file inserted into the presentation and the original slide file contained in the slide library site. A date stamp associated with the last modification date of the original slide file is also encoded into the slide presentation document along with the path data. Accordingly, a link is established between the original slide file in the slide library site and the copy of the original slide file in the slide presentation document.

Once the synchronization relationship is established, the slide presentation application monitors the modification state of the original slide file contained in the slide library site by following the path to the original slide library file and by comparing a present modification date stamp with the last modification date stamp associated with the original slide file. If a present modification date stamp associated with an original slide file is newer than a last modification date stamp, the slide presentation application 120 may determine whether a new version of the original slide file is now available.

According to one embodiment, each time a slide presentation application document is opened, a prompt is provided to the user to query the user as to whether the synchronization relationships between slides in the slide presentation document and corresponding slides in the slide library should be checked for updates. According to another embodiment, a check of the slide library for updates for any synchronized slides is performed automatically. In either case, if a new version of the original slide file is available, the slide presentation application notifies a user that the original slide file has been modified or otherwise updated since the original slide file was first copied to the slide presentation document. A slide update dialog or user interface may be provided to the user to allow the user to review changes made in the original slide file. A user interface similar to the user interface 600 described above may be provided in which a thumbnail image of the new or updated original slide is provided showing changes to the original content or showing new content. The user interface or dialog provided to the user may then provide one or more buttons or controls for allowing the user to act on updates to the original slide file in the context of an open slide presentation document. That is, the user may be allowed to replace the slide file contained in the slide presentation document with a new copy of the slide file contained in the slide library site along with the accompanying changes and/or new content. Alternatively, the user may elect to skip or otherwise ignore changes made to the original slide file contained in the slide library site.

According to an alternate embodiment, the user may add a copy of the updated slide to the slide presentation document in addition to the older slide contained in the slide presentation document so that the user may see both versions of the slide while the user is editing the document. When the copy of the updated slide is added to the slide presentation document, a synchronization relationship is established between the updated slide in the document and the corresponding updated slide in the slide library.

Figure 10:
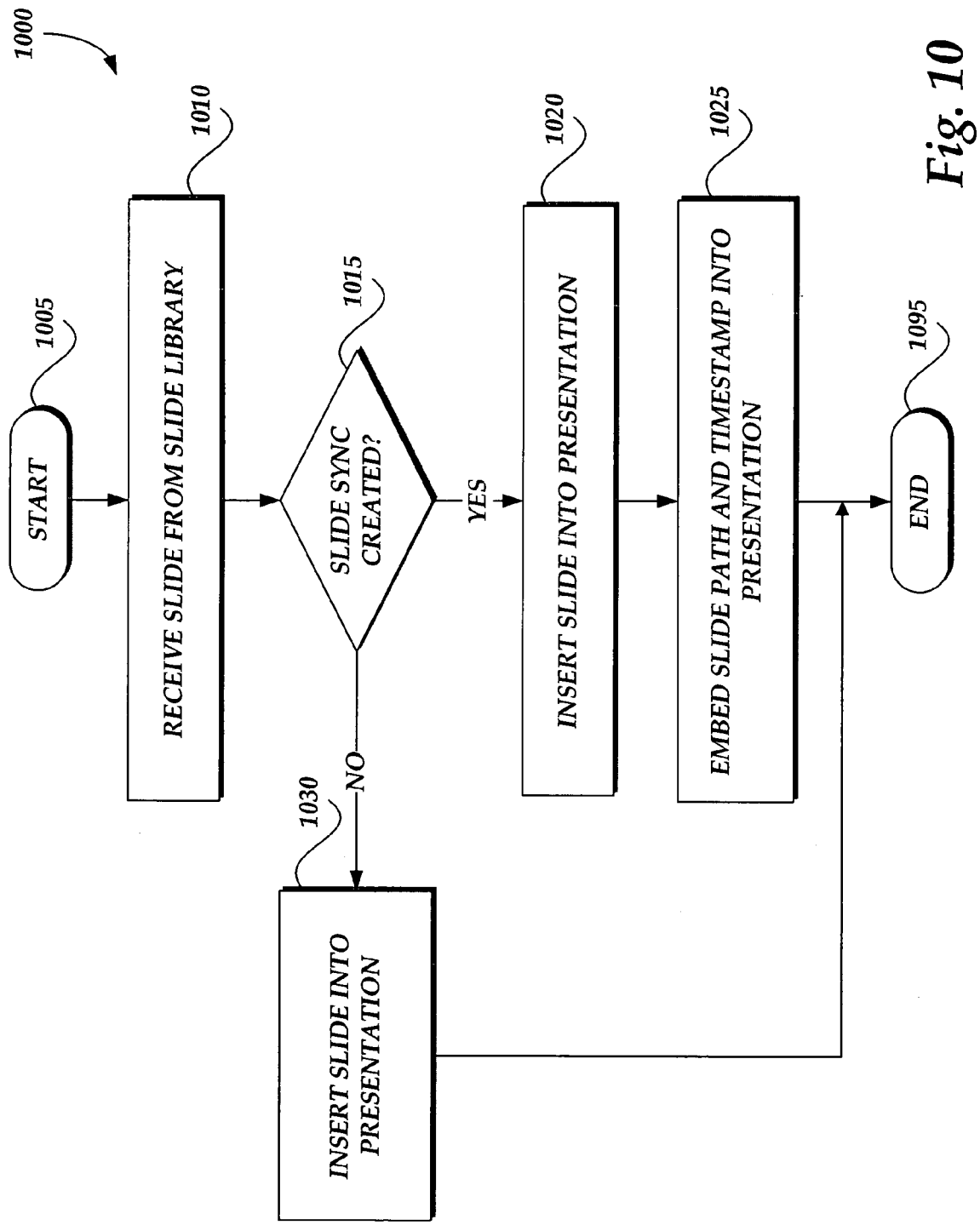
FIG. 10 is a logical flow diagram showing an illustrative routine for establishing a slide synchronization relationship between an original slide file and a copied slide file.

FIG. 10 is a logical flow diagram showing an illustrative routine for establishing a slide synchronization relationship between an original slide file and a copied slide file. The routine 1000 begins at start block 1005 and proceeds to block 1010 where a selected slide file is received from a selected slide library site for insertion into a slide presentation document. At block 1015, a determination is made as to whether a synchronization relationship has been established for the selected slide file for synchronizing a copy of the slide file to be inserted in the slide presentation document with the original slide file contained in the slide library site. If no synchronization relationship has been established, the routine proceeds to block 1030, and the selected slide file is inserted into the slide presentation document without synchronization between the copy of the slide file inserted into the slide presentation document with the original slide file contained in the slide library site.

Referring back to block 1015, if a synchronization relationship has been established, the routine proceeds to block 1020, and a copy of the selected slide file is inserted in the slide presentation document, as desired. At block 1025, a path and last modification timestamp are embedded into the slide file inserted into the slide presentation document for allowing the slide presentation application to monitor the modification state of the original slide file in the slide library site by following the embedded slide path and by comparing the present timestamp associated with the original slide file in the slide library site with the last modified timestamp embedded into the slide file inserted into the slide presentation document. The routine ends at block 1095.

Figure 11:
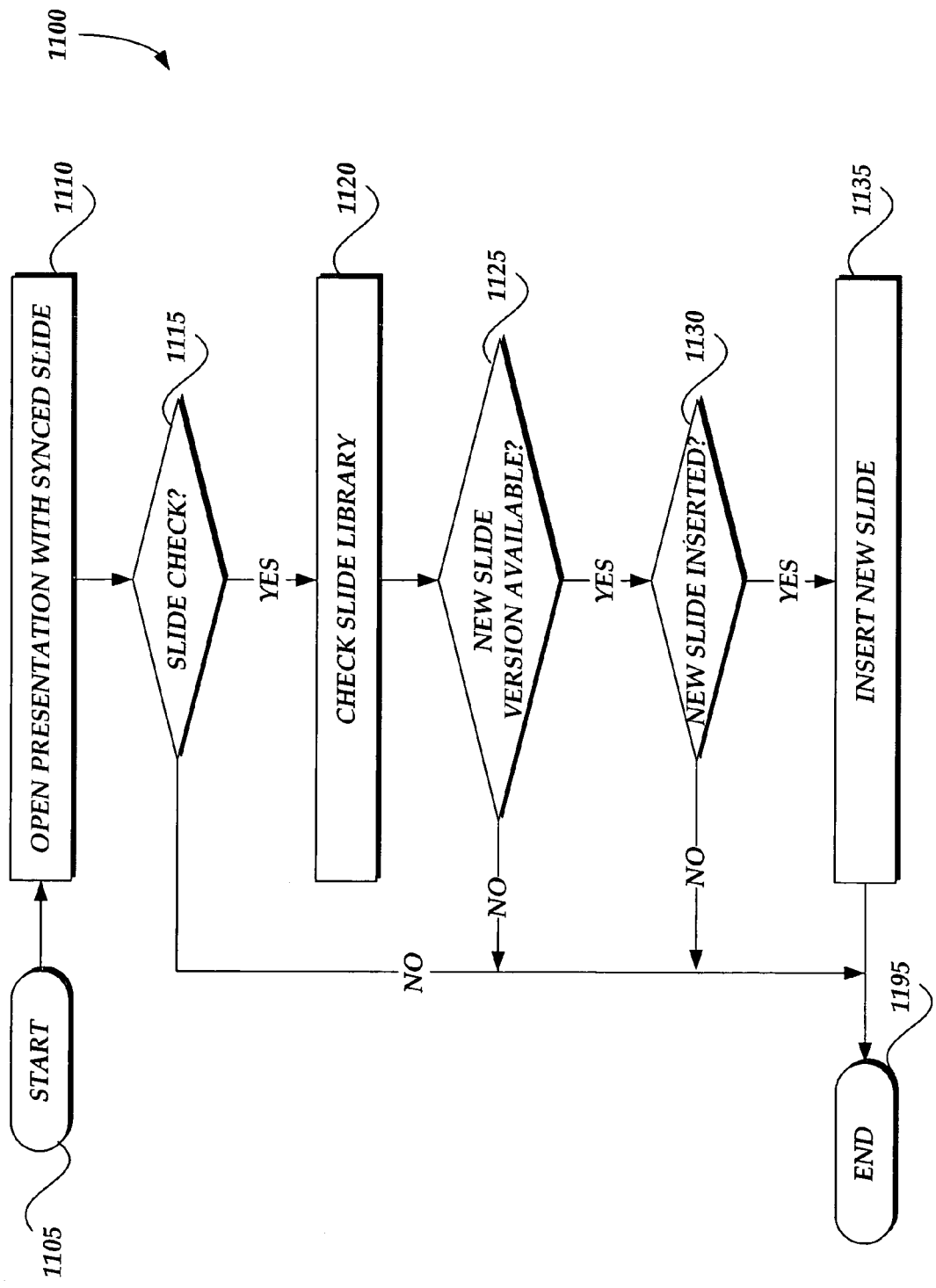
FIG. 11 is a logical flow diagram showing an illustrative routine for checking a synchronized slide file for content changes according to embodiments of the present invention.

FIG. 11 is a logical flow diagram showing an illustrative routine for checking a synchronized slide file for content changes according to embodiments of the present invention. The routine 1100 begins at start block 1105 and proceeds to block 1110 where a slide presentation document is opened and where at least one slide file in the slide presentation document is synchronized with a corresponding slide file contained in an associated slide library site. At block 1115, a determination is made as to whether a synchronized slide file is checked by the slide presentation application against a corresponding original slide file contained in an associated slide library site for modifications to the original slide file. If no check of a synchronized slide file is performed, the routine proceeds to block 1195 and ends.

If a check of a synchronized slide file is performed, the routine proceeds to block 1120, and the slide presentation application follows a path between the synchronized slide in the slide presentation document and an original slide file in the associated slide library site of which the synchronized slide in the slide presentation application document is a copy. As should be appreciated, following the path to the original slide file may include passing a data call from the slide presentation application to the original slide file requesting a return data item associated with the modification timestamp. At block 1125, a determination is made by the slide presentation application as to whether a new version of the original slide file exists. That is, if the data call to the original slide file results in a determination that the modification timestamp has changed, at block 1125, the slide presentation application may request a version state from the original slide file.

If the version of the original slide file has not changed, the routine proceeds to block 1195 and ends. However, if a new version of the original slide file is stored in the slide library site, the routine proceeds to block 1130, and the user/editor of the slide presentation is queried to determine whether the new version of the original slide file contained in the slide library site should be inserted into the slide presentation as a replacement for the corresponding slide contained in the slide presentation document. If the user/editor does not desire to replace the slide in the slide presentation document with the new version of the original slide file, the routine proceeds to block 1195 and ends. If the user does desire to replace the slide contained in the slide presentation document with the new version of the original slide file, the routine proceeds to block 1135, and the new version of the original slide file is copied to the slide presentation document for replacing the corresponding slide in the slide presentation document. The routine ends at block 1195.

As described herein, embodiments of the present invention are directed to methods, systems, and computer products for storing and using slide presentation slides. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A computer-implemented method for managing a synchronization relationship of individual slide files of a slide library, the method comprising:

receiving a source presentation file that includes a plurality of slides that comprise the source presentation file, wherein the plurality of slides include author generated content;

shredding the source presentation file to generate a plurality of individual slide files, wherein each of the plurality of individual slide files includes a single slide of the source presentation file;

populating the slide library with the plurality of individual slide files generated from the shredding of the source presentation file;

generating a first synchronization relationship between a slide in the source presentation file and a respective individual slide file generated during the shredding of the source presentation file, wherein the first synchronization relation includes a first encoded path associated with the slide of the source presentation file and the respective individual slide file:

receiving, in the slide library, a selection of the respective individual slide file having the synchronization relationship with the slide of the source presentation file;

in response to receiving the selection, generating a copy of the respective individual slide file and associating the copy of the respective individual slide file with a destination presentation file;

generating a second synchronization relationship between the copy of the respective individual slide file associated with the destination presentation file and the respective individual slide file located in the slide library, wherein the second synchronization relation includes a second encoded path associated with the copy of the respective individual slide file associated with the destination presentation file and the respective individual slide file located in the library:

upon receiving a modification to the author generated content of the slide in the source presentation document, updating the respective individual slide file located in the slide library with the modification according to the first synchronization relationship, and updating the copy of the respective individual slide file in the destination presentation file with the modification according to the second synchronization relationship.

2. The computer-implemented method of claim 1, wherein shredding the source presentation file to generate a plurality of individual slide files includes automatically identifying a title of the source presentation file and automatically identifying a slide number of each of the plurality of slides within the source presentation file, wherein populating the slide library with the plurality of individual slide files includes automatically displaying the title of the source presentation file in association with the identified slide number for each of the individual slide files.

3. The computer-implemented method of claim 1, wherein shredding the source presentation file to generate a plurality of individual slide files includes automatically identifying a title for each slide of the source presentation file. wherein populating the slide library with the plurality of individual slide files includes automatically displaying the title for each slide of the source presentation file in a description field of the individual slide file.

4. The computer-implemented method of claim 1, further comprising prior to populating the slide library with the plurality of individual slide files, determining whether any of the plurality of individual slide files conflict with any individual slide files previously associated with the slide library, wherein the determination includes comparing a slide file name of the individual slide file with a slide file name of previously associated individual slide files, wherein when the slide file name of the individual slide files is the same as the slide file name of the previously associated individual slide file, generating a conflict resolution prompt for replacing the previously associated individual slide file.

5. The computer-implemented method of claim 1, further comprising determining whether a modification to the author generated content of the slide in the source presentation document has occurred, wherein the determination includes comparing a last modification date stamp of the slide in the source presentation file to a last modification date stamp of the respective individual slide file in the slide library in accordance with the fist sync relationship.

6. The computer-implemented method of claim 5, further comprising determining whether the respective individual slide file of the slide library has been updated in accordance to the first synchronization relationship, wherein the determination includes comparing a last modification date stamp of the copy of the respective individual slide file associated with the destination presentation file with the last modification date stamp of the respective individual slide file in the slide library in accordance with the second synchronization relationship.

7. The computer-implemented method of claim 6, wherein the destination presentation file queries the slide library to determine whether the respective individual slide file of the slide library has been updated.

8. A computer-readable storage medium having computer executable instructions for managing a synchronization relationship of individual slide files of a slide library, the instructions comprising:

receiving a source presentation file that includes a plurality of slides that comprise the Source presentation file;

shredding the source presentation file to generate a plurality of individual slide files, wherein each of the plurality of individual slide files includes a single slide of the source presentation file;

populating the slide library with the plurality of individual slide files generated from the shredding of the source presentation file;

generating a first synchronization relationship between a slide in the source presentation file and a respective individual slide file generated during the shredding of the source presentation file;

receiving, in the slide library, a selection of the respective individual slide file having the synchronization relationship with the slide of the source presentation file;

in response to receiving the selection, generating a copy of the respective individual slide file and associating the copy of the respective individual slide file with a destination presentation file:

generating a second synchronization relationship between the copy of the respective individual slide file associated with the destination presentation file and the respective individual slide file located in the slide library;

upon receiving a modification to the slide in the source presentation document, updating the respective individual slide file located in the slide library with the modification according to the first synchronization relationship; and upon the destination presentation file receiving an indication that the respective individual slide file located in the slide library has been modified according to the first synchronization relationship, generating a prompt in the destination presentation file for receiving a selection to update the copy of the respective individual slide file in the destination presentation file with the modification according to the second synchronization relationship.

9. The computer-readable storage medium of claim 8, wherein shredding the source presentation file to generate a plurality of individual slide files includes automatically identifying a title of the source presentation file and automatically identifying a slide number of each of the plurality of slides within the source presentation file, wherein populating the slide library with the plurality of individual slide files includes automatically displaying the title of the source presentation file in association with the identified slide number for each of the individual slide files.

10. The computer-readable storage medium of claim 8, wherein shredding the source presentation file to generate a plurality of individual slide files includes automatically identifying a title for each slide of the source presentation file, wherein populating the slide library with the plurality of individual slide files includes automatically displaying the title for each slide of the source presentation file in a description field of the individual slide file.

11. The computer-readable storage medium of claim 8, further comprising Prior to populating the slide library with the plurality of individual slide files, determining whether any of the plurality of individual slide files conflict with any individual slide files previously associated with the slide library, wherein the determination includes comparing a slide file name of the individual slide file with a slide file name of previously associated individual slide files, wherein when the slide file name of the individual slide files is the same as the slide file name of the previously associated individual slide file, generating a conflict resolution prompt for replacing the previously associated individual slide file.

12. The computer-readable storage medium of claim 8, further comprising determining whether a modification of the slide in the source presentation document has occurred, wherein the determination includes comparing a last modification date stamp of the slide in the source presentation file to a last modification date stamp of the respective individual slide file in the slide library in accordance with the fist sync relationship.

13. The computer-readable storage medium of claim 12, further comprising determining whether the respective individual slide file of the slide library has been updated in accordance to the first synchronization relationship, wherein the determination includes comparing a last modification date stamp of the copy of the respective individual slide file associated with the destination presentation file with the last modification date stamp of the respective individual slide file in the slide library in accordance with the second synchronization relationship.

14. The computer-readable storage medium of claim 13, wherein the destination presentation file queries the slide library to determine whether the respective individual slide file of the slide library has been updated.

15. A system for managing a synchronization relationship of individual slide files of a slide library, the system comprising:

a processor; and a memory having computer executable instructions stored thereon, the computer executable instructions being configured for:

receiving a source presentation file that includes a plurality of slides that comprise the source presentation file;

shredding the source presentation file to generate a plurality of individual slide files, wherein each of the plurality of individual slide file includes a single slide of the source presentation file;

populating the slide library with the plurality of individual slide files generated from the shredding of the source presentation file:

generating a first synchronization relationship between a slide in the source presentation file and a respective individual slide file generated during the shredding of the source presentation file;

receiving, in the slide library, a selection of the respective individual slide file having the synchronization relationship with the slide of the source presentation file;

in response to receiving the selection, generating a copy of the respective individual slide file and associating the copy of the respective individual slide file with a destination presentation file;

generating a second synchronization relationship between the copy of the respective individual slide file associated with the destination presentation file and the respective individual slide file located in the slide library; and upon receiving a modification to the slide in the source presentation document, updating the respective individual slide file located in the slide library with modification according to the first synchronization relationship and updating the copy of the respective individual slide file in the destination presentation file with the modification according to the second synchronization relationship.

16. The system of claim 15, wherein shredding the source presentation file to generate a plurality of individual slide files includes automatically identifying a title of the source presentation file and automatically identifying a slide number of each of the plurality of slides within the source presentation file, wherein populating the slide library with the plurality of individual slide files includes automatically displaying the title of the source presentation file in association with the identified slide number for each of the individual slide files.

17. The system of claim 15, wherein shredding the source presentation file to generate a plurality of individual slide files includes automatically identifying a title for each slide of the source presentation file, wherein populating the slide library with the plurality of individual slide files includes automatically displaying the title for each slide of the source presentation file in a description field of the individual slide file.

18. The system of claim 15, further comprising prior to populating the slide library with the plurality of individual slide files, determining whether any of the plurality of individual slide files conflict with any individual slide file previously associated with the slide library, wherein the determination includes comparing a slide file name of the individual slide file with a slide fine name of previously associated individual slide files, wherein when the slide file name of the individual slide files is the same as the slide fine name of the previously associated individual slide file, generating a conflict resolution prompt for replacing the previously associated individual slide file.

19. The system of claim 15, further comprising determining whether a modification of the slide in the source presentation document has occurred, wherein the determination includes comparing a last modification date stamp of the slide in the source presentation file to a last modification date stamp of the respective individual slide file in the slide library in accordance with the fist sync relationship.

20. The system of claim 19, further comprising determining whether the respective individual slide file of the slide library has been updated in accordance to the first synchronization relationship, wherein the determination includes comparing a last modification date stamp of the copy of the respective individual slide file associated with the destination presentation file with the last modification date stamp of the respective individual slide file in the slide library in accordance with the second synchronization relationship.

\* \* \* \* \*

UNITED STATES PATENT AND TRADEMARK OFFICE
CERTIFICATE OF CORRECTION

PATENT NO. : 7,493,561 B2
APPLICATION NO. : 11/166910
DATED : February 17, 2009
INVENTOR(S) : Chaitanya Dev Sareen et al.

It is certified that error appears in the above-identified patent and that said Letters Patent is hereby corrected as shown below:

In column 15, line 46, in Claim 1, delete "file:" and insert -- file; --, therefor.

In column 15, line 62, in Claim 1, delete "library:" and insert -- library; --, therefor.

In column 16, line 60, in Claim 8, delete "Source" and insert -- source --, therefor.

In column 17, line 11, in Claim 8, delete "file:" and insert -- file; --, therefor.

In column 17, line 49, in Claim 11, delete "Prior" and insert -- prior --, therefor.

In column 18, line 31, in Claim 15, delete "file:" and insert -- file; --, therefor.

In column 19, line 12, in Claim 18, delete "fine" and insert -- file --, therefor.

In column 19, line 14, in Claim 18, delete "fine" and insert -- file --, therefor.

Signed and Sealed this
Third Day of May, 2011

David J. Kappos
*Director of the United States Patent and Trademark Office*